(12) United States Patent
Nishijima et al.

(10) Patent No.: US 6,877,339 B2
(45) Date of Patent: Apr. 12, 2005

(54) EJECTOR CYCLE

(75) Inventors: Haruyuki Nishijima, Obu (JP); Hirotsugu Takeuchi, Nagoya (JP); Makoto Ikegami, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/868,635

(22) Filed: Jun. 15, 2004

(65) Prior Publication Data

US 2004/0255611 A1 Dec. 23, 2004

(30) Foreign Application Priority Data

Jun. 18, 2003 (JP) .................................. 2003-173844

(51) Int. Cl.[7] .............................................. F25B 1/00
(52) U.S. Cl. ........................... 62/500; 62/116; 62/175; 62/191
(58) Field of Search ........................ 62/116, 175, 191, 62/500, 512, 527

(56) References Cited

U.S. PATENT DOCUMENTS 6,477,857 B2 * 11/2002 Takeuchi et al. ............. 62/500
6,604,379 B2 * 8/2003 Hotta et al. .................. 62/500
6,729,149 B2 * 5/2004 Takeuchi ..................... 62/191
2004/0007014 A1  1/2004 Takeuchi et al.

FOREIGN PATENT DOCUMENTS

JP          5-26522      2/1993
JP          5-149652     6/1993

* cited by examiner

*Primary Examiner*—Melvin Jones
(74) *Attorney, Agent, or Firm*—Harness, Dickey & Pierce, pLC

(57) ABSTRACT

In an ejector cycle with an ejector including a nozzle for decompressing refrigerant, a variable throttle device is disposed upstream from the nozzle to decompress and expand high-pressure refrigerant flowing from a condenser. For example, the variable throttle device decompresses the high-pressure refrigerant in a gas-liquid two-phase state at an upstream position from the nozzle of the ejector. In addition, the variable throttle device includes a back pressure chamber having an inner pressure that changes by sensing a refrigerant temperature at a refrigerant outlet side of an evaporator, and a pressure introducing means for introducing a refrigerant pressure of a refrigerant outlet side of the evaporator to a side opposite to the back pressure chamber with respect to a diaphragm. Therefore, a pressure difference between the back pressure chamber and the side opposite to the back pressure chamber can be made smaller.

13 Claims, 4 Drawing Sheets

EJECTOR CYCLE

CROSS-REFERENCE TO RELATED APPLICATION

This application is related to and claims priority from Japanese Patent Application No. 2003-173844 filed on Jun. 18, 2003, the contents of which are hereby incorporated by reference.

BACKGROUND OF THE INVENTION

1. Field of the Invention

The present invention relates to an ejector cycle including an ejector. In the ejector cycle, a variable throttle device is disposed upstream of a nozzle of the ejector, so that high-pressure refrigerant is decompressed in the variable throttle device before being decompressed in the nozzle.

2. Description of Related Art

In an ejector cycle, refrigerant is decompressed and expanded in a nozzle of an ejector so that gas refrigerant evaporated in an evaporator is sucked, and pressure of refrigerant to be sucked into a compressor is increased by converting expansion energy to pressure energy. In the nozzle of the ejector, the pressure energy of the refrigerant is converted to the speed energy thereof. Further, because refrigerant passing through the nozzle is decompressed to stride over the saturation liquid line, refrigerant boils near an inner wall surface defining a throttle portion of the nozzle. On the other hand, in a center portion separated from the inner wall surface of the nozzle, because refrigerant is difficult to boil, liquid dorps of refrigerant are difficult to become minute. Therefore, nozzle efficiency and ejector efficiency may be decreased in the ejector cycle.

To overcome this problem, in JP-A-5-149652, a fixed throttle is disposed upstream from a nozzle in an ejector, so that refrigerant is decompressed by the fixed throttle and the nozzle in two steps. That is, refrigerant boils once in the fixed throttle at the first step, and the refrigerant is expanded at an inlet of the nozzle so as to boil in the nozzle at the second step while generating a bubble core. In the ejector, because the first throttle is the fixed throttle, a flow amount cannot be adjusted. Therefore, the nozzle efficiency and the ejector efficiency of the ejector cycle cannot be improved in a wide load variation area.

SUMMARY OF THE INVENTION

In view of the foregoing problems, it is an object of the present invention to provide an ejector cycle having an ejector, which effectively improves an ejector efficiency and a nozzle efficiency in a wide load variation area of the ejector cycle.

It is another object of the present invention to provide an ejector cycle having a variable throttle device upstream of an ejector, which can be effectively operated while preventing a damage of a diaphragm in the variable throttle device.

According to the present invention, an ejector cycle includes a compressor for compressing refrigerant, a high-pressure heat exchanger for cooling high-pressure refrigerant discharged from the compressor, a low-pressure heat exchanger for evaporating low-pressure refrigerant after being decompressed, a variable throttle device disposed at a refrigerant outlet side of the high-pressure heat exchanger, an ejector, and a gas-liquid separator for separating refrigerant from the ejector into gas refrigerant and liquid refrigerant. The ejector includes a nozzle for decompressing and expanding refrigerant flowing from the variable throttle device by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger. In the ejector cycle, the variable throttle device includes a back pressure chamber having an inner pressure that changes by sensing a refrigerant temperature at a refrigerant outlet side of the low-pressure heat exchanger, and a pressure introducing means for introducing a refrigerant pressure at the refrigerant outlet side of the low-pressure heat exchanger to a side opposite to the back pressure chamber.

Because the variable throttle device is provided upstream of the nozzle of the ejector, it is possible to suitably decompress refrigerant before being introduced into the nozzle of the ejector. Accordingly, ejector efficiency and nozzle efficiency can be effectively improved while a sufficient cooling capacity can be obtained in the ejector cycle, in a wide load vibration area of the ejector cycle. In addition, the refrigerant pressure at the refrigerant outlet side of the low-pressure heat exchanger is applied to the side opposite to the back pressure chamber in the variable throttle device, a pressure difference between the back pressure chamber and the side opposite to the back pressure chamber can be made smaller. Generally, the variable throttle device further includes a diaphragm for defining the back pressure chamber, and a valve body displaced in accordance with a movement of the diaphragm to change a throttle open degree. In this case, the pressure introducing means is provided to introduce the refrigerant pressure at the refrigerant outlet side of the low-pressure heat exchanger to the side opposite to the back pressure chamber with respect to the diaphragm. Accordingly, pressure change characteristics of gas sealed in the back pressure chamber can be made suitable, and it can prevent the diaphragm from being damaged due to the pressure difference.

Preferably, the variable throttle device has a temperature transmitting means for transmitting the refrigerant temperature at the refrigerant outlet side of the low-pressure heat exchanger to the back pressure chamber. Therefore, the valve body can change the throttle open degree in accordance with a super-heating degree of the refrigerant at the refrigerant outlet side of the low-pressure heat exchanger.

For example, the pressure introducing means is a refrigerant outer pipe through which the refrigerant outlet side of the low-pressure heat exchanger communicates with a space opposite to the back pressure chamber with respect to the diaphragm. Alternatively, a part of a connection rod connected between the diaphragm and the valve body is exposed in a refrigerant passage through which refrigerant from the refrigerant outlet side of the low-pressure heat exchanger flows, and is used as the pressure introducing means.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
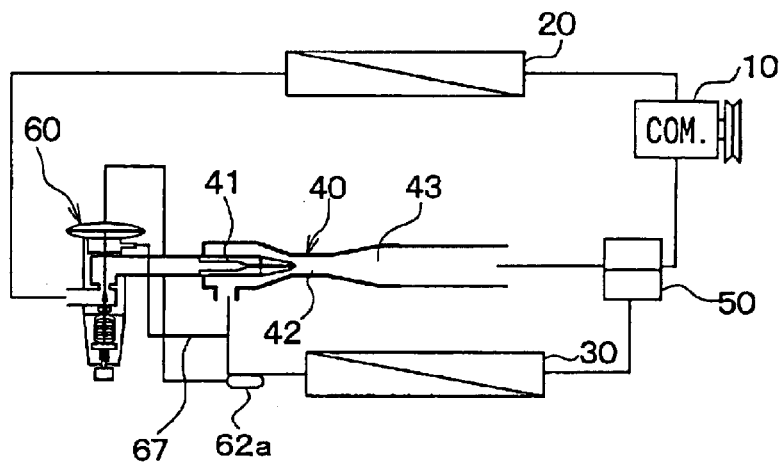
FIG. 1 is a schematic diagram showing an ejector cycle including an ejector and a variable throttle device according to a first preferred embodiment of the present invention.
Figure 2:
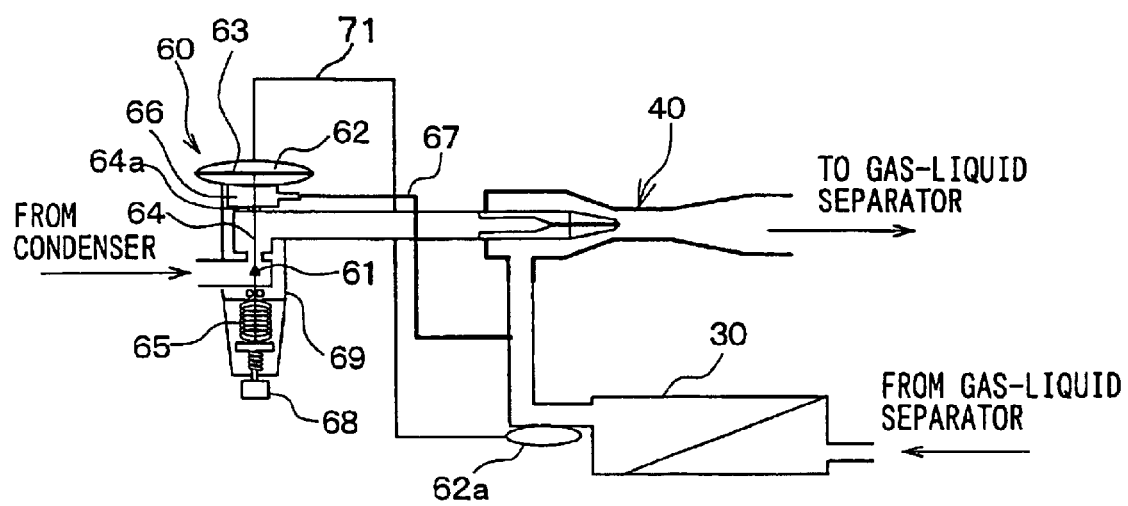
FIG. 2 is a schematic enlarged view showing the structure of the variable throttle device in the ejector cycle, according to the first embodiment.

In the first embodiment, an ejector cycle is typically used as a vapor compression refrigerator for a showcase for cooling and refrigerating foods and drinks or as a vapor compression refrigerator mounted in a vehicle for transporting foods and drinks while keeping at a cooling or refrigerating state. As shown in FIG. 1, a compressor 10 is an electric compressor for sucking and compressing refrigerant circulated in the ejector cycle. A condenser 20 (cooler, radiator) is a high-pressure heat exchanger for cooling high-temperature and high-pressure refrigerant discharged from the compressor 10 by performing heat-exchange operation between outside air and the high-temperature and high-pressure refrigerant.

Further, an evaporator 30 is a low-pressure heat exchanger for cooling air to be blown into the showcase by evaporating liquid refrigerant, more specifically, by performing heat-exchange operation between the air and low-pressure refrigerant. An ejector 40 sucks refrigerant evaporated in the evaporator 30 while decompressing and expanding refrigerant flowing out from the condenser 20 in a nozzle 41, and increases pressure of refrigerant to be sucked into the compressor 10 by converting expansion energy to pressure energy.

The ejector 40 includes the nozzle 41, a mixing portion 42, and a diffuser 43. The nozzle 41 decompresses and expands high-pressure refrigerant flowing into the ejector 40 in iso-enthalpy by converting pressure energy of the high-pressure refrigerant from the condenser 20 to speed energy thereof. The mixing portion 42 sucks refrigerant evaporated in the evaporator 30 by using an entrainment function of high-speed refrigerant stream injected from the nozzle 41, and mixes the sucked refrigerant and the refrigerant jetted from the nozzle 41. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

In the mixing portion 42, a drive stream of refrigerant from the nozzle 41 and a suction stream of the refrigerant from the evaporator 30 are mixed so that their momentum sum is conserved, thereby increasing refrigerant pressure. In the diffuser 43, because a refrigerant passage sectional area gradually increases toward its outlet side, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle having the smallest passage area in its refrigerant passage. However, a nozzle tapered toward its outlet side can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to an inlet side of the evaporator 30. Accordingly, in the ejector cycle, liquid refrigerant flows into the evaporator 30 while refrigerant from the condenser 20 is decompressed in the nozzle 41 of the ejector 40.

A throttle is generally disposed between the gas-liquid separator 50 and the evaporator 30, for decompressing refrigerant flowing from the gas-liquid separator 50 toward the evaporator 30. Further, an oil return passage can be provided in the gas-liquid separator 50, so that lubrication oil separated by the gas-liquid separator 50 can be sucked to the compressor 10.

A variable throttle device 60 is disposed in a refrigerant passage between the condenser 20 and the ejector 40. The variable throttle device 60 is an expansion valve disposed upstream from the nozzle 41 of the ejector 40, which decompresses high-pressure refrigerant flowing from the condenser 20 to a gas-liquid two-phase state. The variable throttle device 60 controls its throttle open degree so that a super-heating degree of refrigerant at a refrigerant outlet side of the evaporator 30 becomes in a predetermined range (e.g., 0.1–10 degrees).

Specifically, the variable throttle device 60 includes a valve body 61 for changing a throttle open degree, a thin film diaphragm 63, a connection rod 64, a spring 65, an adjustment screw 68 and an outer pipe 67. The thin film diaphragm 63 is constructed to define a back pressure chamber 62 having an inner pressure that changes by sensing a refrigerant temperature at a refrigerant outlet side of the evaporator 30, a pressure chamber 66 opposite to the back pressure chamber 62 with respect to the diaphragm 63. The connection rod 64 is connected to the valve body 61 and the diaphragm 63 so that a displacement of the diaphragm 63 is transmitted to the valve body 61. The spring 65 is biased so that its spring force is applied to the valve body 61 in a direction where the volume of the back pressure chamber 62 is reduced. The outer pipe 67 is a pressure introducing means for introducing a refrigerant pressure at the refrigerant outlet side of the evaporator 30 to the pressure chamber 66 opposite to the back pressure chamber 62 with respect to the diaphragm 63.

The back pressure chamber 62 communicates with a temperature sensing portion 62a that senses a refrigerant temperature at the refrigerant outlet side of the evaporator 30, so that the refrigerant temperature at the refrigerant outlet side of the evaporator 30 is transmitted to the back pressure chamber 62 through the temperature sensing portion 62a.

In this embodiment, the valve body 61, the diaphragm 63 and the connection rod 64 are made of metal such stainless steel, and a valve case member 69 for forming the back pressure chamber or the pressure chamber 66 is made of metal such as aluminum, for example.

Further, the adjustment screw 68 is disposed to absorb a manufacturing difference of the variable throttle device 60, and to adjust the spring force to be applied to the diaphragm 63 so that a refrigerant super-heating degree at the refrigerant outlet side of the evaporator 30 becomes in a predetermined range. In addition, a seal member 64a made of rubber or resin is attached to seal the pressure chamber 66.

The valve case member 69 of the variable throttle device 60 is integrated with the ejector 40, so that a decompression member constructed with the variable throttle device 60 and the ejector 40 can be downsized.

Next, operation of the variable throttle device 60 will be now described. Generally, the same gas refrigerant as the circulating refrigerant is sealed in the back pressure chamber 62 by a predetermined liquid density. Therefore, a pressure Pf inside the back pressure chamber 62 is changed to become a saturation pressure at a refrigerant temperature on the refrigerant outlet side of the evaporator 30. Thus, the diaphragm 63 displaces in accordance with a balance between the pressure Pf in the back pressure chamber 62, the pressure Po in the pressure chamber 66 and the spring force Fp of the spring 65. The spring force Fp of the spring 65 is selected so that a refrigerant super-heating degree on the refrigerant outlet side of the evaporator 30 becomes in a predetermined range. Accordingly, the throttle open degree of the variable throttle device 60 can be controlled so that refrigerant super-heating degree at the refrigerant outlet side of the evaporator 30 becomes in the predetermined range.

For example, when the pressure in the evaporator 30, that is, the thermal load in the evaporator 30 becomes higher so that the refrigerant super-heating degree at the refrigerant outlet side of the evaporator 30 becomes higher, the throttle open degree of the variable throttle device 60 is made smaller. In this case, a flow speed of refrigerant (drive flow) jetted from the nozzle 41 is increased, and thereby increasing an amount of refrigerant (suction-flow refrigerant) circulating in the evaporator 30. Conversely, when the pressure in the evaporator 30, that is, the thermal load in the evaporator 30 becomes lower so that the refrigerant super-heating degree at the outlet side of the evaporator 30 becomes lower, the throttle open degree of the variable throttle device 60 is made larger. In this case, a flow speed of refrigerant (drive flow) jetted from the nozzle 41 is decreased, and thereby decreasing the amount of refrigerant (suction-flow refrigerant) circulating in the evaporator 30.

Next, operation of the ejector cycle according to the first embodiment will be now described.

As shown in FIG. 1, refrigerant discharged from the compressor 10 circulates toward the condenser 20. Then, high-pressure refrigerant is cooled in the condenser 20 and is decompressed in the variable throttle device 60 in iso-enthalpy to a gas-liquid two-phase state. Thereafter, refrigerant from the variable throttle device 60 is further decompressed in the nozzle 41 of the ejector 40 in iso-enthalpy, so that the refrigerant speed at the outlet of the nozzle 41 of the ejector 40 becomes equal to or higher than the speed of the sound. Thereafter, refrigerant from the outlet of the nozzle 41 flows into the mixing portion 42 of the ejector 40.

Figure 3:
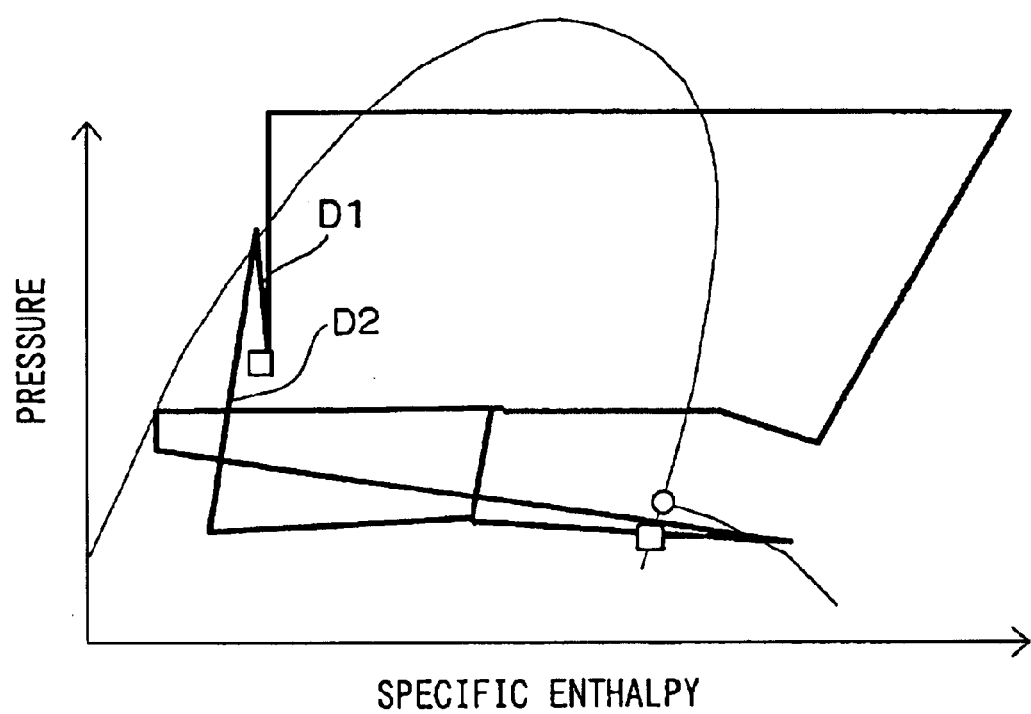
FIG. 3 is a Mollier diagram (p-h diagram) for explaining decompression operation of the variable throttle device and the nozzle of the ejector in the ejector cycle, according to the first embodiment.

FIG. 3 shows a refrigerant pressure by the decompression operation at two steps in the ejector cycle. In FIG. 3, D1 shows a decompression operation in the first throttle by using the variable throttle device 60, and D2 shows a decompression operation in the second throttle by using the nozzle 41 of the ejector 40. Refrigerant flowing into the variable throttle device 60 is decompressed by the variable throttle device 60 so as to boil once at an inlet side of the nozzle 41. Therefore, bubbles are generated by the variable throttle device 60, and boiling cores are generated after the bubbles disappear at the inlet side of the nozzle 41. Refrigerant with the boiling cores is further boiled by the nozzle 41, so that fine liquid drops (i.e., minute liquid drops) of refrigerant are generated. Because the boiling of refrigerant is facilitated in the nozzle 41, the generation of minute liquid drops of the refrigerant can be facilitated in the nozzle 41. Accordingly, the nozzle efficiency can be effectively improved.

In the first embodiment, freon is used as the refrigerant so that a refrigerant pressure at the high pressure side is lower than the critical pressure of the refrigerant. Therefore, the refrigerant pressure flowing into the nozzle 41 is lower than the critical pressure of the refrigerant.

The mixing portion 42 sucks refrigerant evaporated in the evaporator 30 by using the entrainment function of high-speed refrigerant stream injected from the nozzle 41, and mixes the sucked refrigerant and the injected refrigerant therein. Further, the diffuser 43 mixes the refrigerant injected from the nozzle 41 and the refrigerant sucked from the evaporator 30, and increases the refrigerant pressure. Therefore, the ejector efficiency can be improved. Accordingly, low-pressure refrigerant in the gas liquid separator 50 circulates the evaporator 30 and the pressure increasing portion of the ejector 40, in this order, and returns to the gas-liquid separator 50.

According to the first embodiment of the present invention, the refrigerant is decompressed by the variable throttle device 60 to the gas-liquid two-phase refrigerant at an upstream side of the throat portion 41a of the nozzle 41. Therefore, it can prevent the refrigerant from being throttled more than a necessary degree while the ejector efficiency can be effectively improved. Further, because the throttle open degree of the variable valve is controlled based on the thermal load (e.g., the super-heating degree of the refrigerant at the outlet side of the evaporator 30), the ejector efficiency of the ejector cycle can be improved even when the cooling load of the ejector cycle is changed. Thus, the ejector cycle can be used in a wide load variation area, while the ejector efficiency, the nozzle efficiency and the cooling capacity of the ejector cycle are improved.

According to the first embodiment of the present invention, the diaphragm 63 is displaced so that the pressure Pf in the back pressure chamber 62, that is, the saturation gas pressure on the refrigerant temperature at the refrigerant outlet side of the evaporator 30 balances with the sum of the pressure Po in the pressure chamber 66 and the spring force Fp. In the ejector cycle, as shown in FIG. 3, the pressure inside the pressure chamber 66, that is, the refrigerant pressure at the refrigerant outlet side of the evaporator 30 is lower than the pressure of the refrigerant after being decompressed in the variable throttle device 60. Thus, it is compared with a case where the pressure of refrigerant decompressed in the variable throttle device 60 is directly applied to the diaphragm 63 at a side opposite to the back pressure chamber 62, a pressure difference applied to the diaphragm 63 can be smaller. Accordingly, the pressure changing characteristic of the gas sealed in the back pressure chamber 62 can be readily suitably controlled, and it can prevent the diaphragm 63 from being damaged due to the pressure difference of the diaphragm 63.

Figure 5:
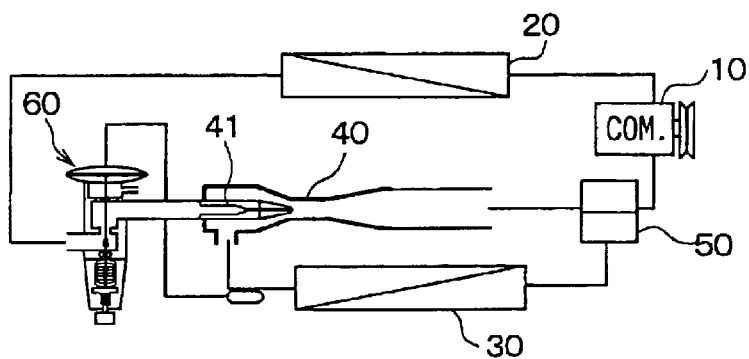
FIG. 5 is a schematic diagram showing an ejector cycle having a variable throttle device in a comparison example of the present invention.
Figure 6:
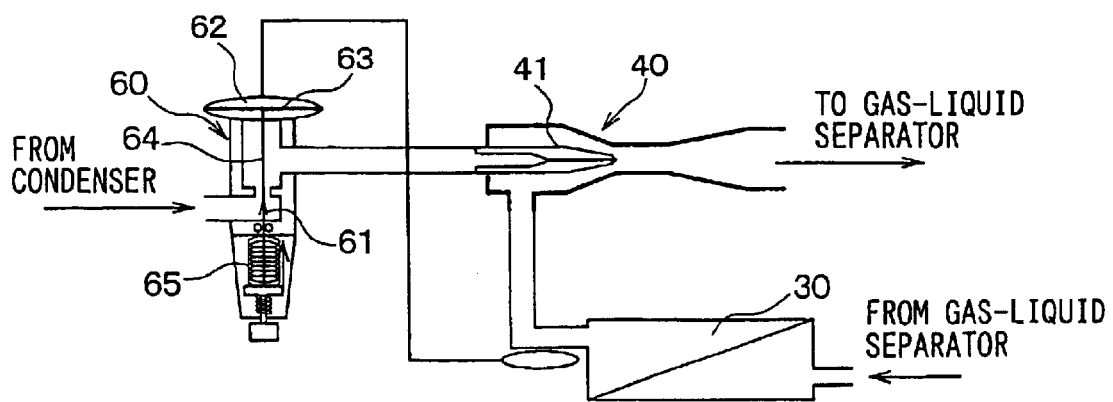
FIG. 6 is a schematic enlarged view showing the variable throttle device in the ejector cycle of FIG. 5.

FIG. 5 shows an ejector cycle in a comparison example, and FIG. 6 shows a detail structure of a variable throttle device 60 in FIG. 5. In this comparison example, the pressure inside the back pressure chamber 62 changes to become the saturation gas pressure on the refrigerant temperature at the refrigerant outlet side of the evaporator 30, similarly to the first embodiment, However, in the comparison example, the pressure of the refrigerant decompressed in a throttle port of the variable throttle device 60 is applied to the diaphragm 63 on the side opposite to the back pressure chamber 62. Thus, the diaphragm 63 displaces in accordance with a balanced position between the pressure in the back pressure chamber 62 corresponding to the saturation gas pressure on the refrigerant temperature at the refrigerant outlet side of the evaporator 30, the refrigerant pressure applied to the diaphragm 63 on the side opposite to the back pressure chamber 62, and the spring pressure of the spring 65. However, in this case, the refrigerant pressure decompressed in the variable throttle device 60 at the first step decompression is greatly higher than the pressure in the back pressure chamber 62. Accordingly, it is difficult to suitably set the pressure changing characteristics of the gas sealed in the back pressure chamber 62, and the diaphragm 63 may be damaged by the large pressure difference applied to the diaphragm 63.

According to the first embodiment of the present invention, the pressure chamber 66 is provided opposite to the back pressure chamber 62 with respect to the diaphragm 63, and the outer pipe 77 (pressure introducing means) is provided to introduce the refrigerant pressure at the refrigerant outlet side of the evaporator 30 to the pressure chamber 66 opposite to the back pressure chamber 62 with respect to the diaphragm 63. Therefore, the refrigerant pressure at the refrigerant outlet side of the evaporator 30, that is greatly lower than the refrigerant pressure decompressed in the variable throttle device 60, is introduced into the pressure chamber 66 and is applied to the diaphragm 63 from the pressure chamber 63. Thus, a pressure difference applied to the diaphragm 63 can be made smaller than that in the comparison example. Accordingly, the pressure changing characteristics of gas sealed in the back pressure chamber 62 can be suitably set, and it can prevent the diaphragm 63 from being damaged by the pressure difference.

(Second Embodiment)

Figure 4:
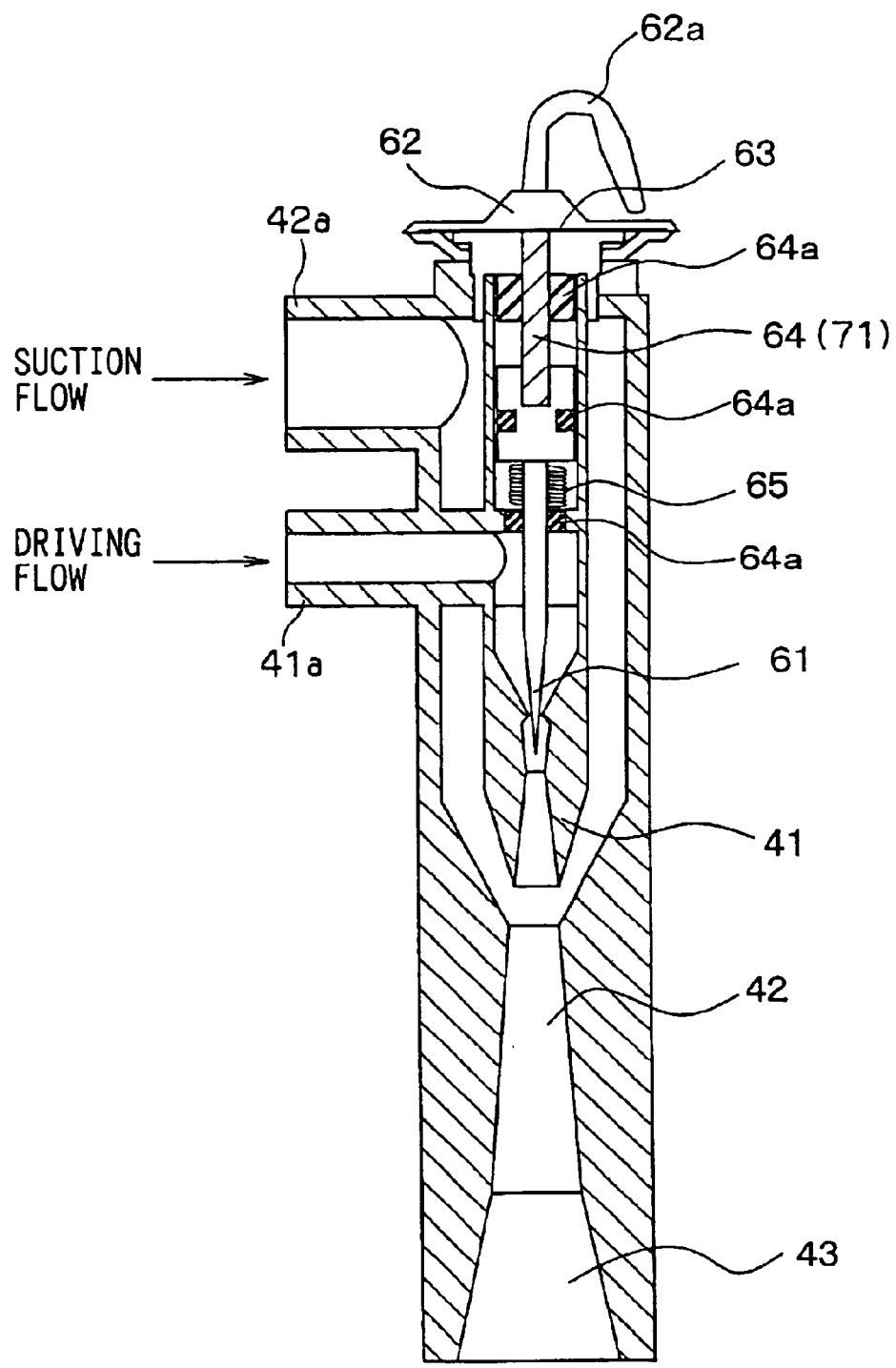
FIG. 4 is a schematic sectional view showing a variable throttle device in an ejector cycle according to a second preferred embodiment of the present invention.

The second embodiment of the present invention will be now described with reference to FIG. 4. In the above-described first embodiment, the refrigerant temperature at the refrigerant outlet side of the evaporator 30 is introduced to the back pressure chamber 62 through the temperature sensing portion 62a. However, in the second embodiment, as shown in FIG. 4, a part of the connection rod 64 is exposed in a refrigerant passage through which gas refrigerant sucked from the evaporator 30 flows. That is, as shown in FIG. 4, a part of the connection rod 64 is arranged in a refrigerant passage through which refrigerant from a refrigerant suction port 42a of the ejector 4 flows, so that the refrigerant temperature at the refrigerant outlet side of the evaporator 30 can be sensed by the connection rod 64. At least the part of the connection rod 64, exposed in the refrigerant passage, is made of a high thermal-conductive material such as copper so as to construct a temperature transmission portion. Therefore, the refrigerant temperature at the refrigerant outlet side of the evaporator 30 is transmitted to the back pressure chamber 62 through the connection rod 64 and the diaphragm 63.

In addition, a refrigerant introduction port 41a through which refrigerant from the condenser 20 (cooler) is introduced is provided adjacent to the suction port 42a.

In the second embodiment, the refrigerant at the refrigerant outlet side of the evaporator 30 is introduced to a space around the temperature transmission portion in the connection rod 64. Therefore, the outer pipe 67 described in the first embodiment is omitted. A refrigerant filling pipe 62a for filling refrigerant in the back pressure chamber 62 is provided.

In the second embodiment, the variable throttle device is integrated with the ejector 40 to construct an integrated structure. Therefore, the structure of the variable throttle device 60 can be made simple, and the ejector cycle can be manufactured in low cost. Further, similarly to the above-described first embodiment, the refrigerant pressure at the refrigerant outlet side of the evaporator 30, that is greatly lower than the refrigerant pressure decompressed in the variable throttle device 60, is applied to the diaphragm 63 at a side opposite to the back pressure chamber 62. Thus, a pressure difference applied to the diaphragm 63 can be made smaller. Accordingly, the pressure changing characteristics of gas sealed in the back pressure chamber 62 can be suitably set, and it can prevent the diaphragm 63 from being damaged by the pressure difference.

In the second embodiment, the other parts are similar to those of the above-described first embodiment, and detail description thereof is omitted. Therefore, the advantages described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments of the present invention, freon is used as the refrigerant in the ejector cycle. However, the present invention can be applied to an ejector cycle where the other refrigerant can be used. Even in this case, refrigerant is decompressed by two steps due to the variable throttle device 60 and the nozzle 41. For example, carbon hydride or carbon dioxide can be used as the refrigerant. Even in this case, the throttle open degree of the variable throttle device 60 can be controlled based on the thermal load at the low-pressure side in the ejector cycle.

Further, the present invention can be applied to an ejector cycle where the refrigerant pressure at the high-pressure side is equal to or higher than the critical pressure of the refrigerant. In this case, natural refrigerant such as carbon dioxide can be suitably used.

In the above-described embodiments of the present invention, the ejector cycle is used for the vapor-compression refrigerator for cooling and refrigerating the foods in the showcase. However, the ejector cycle of the present invention can be used for an air conditioner. Further, in the above-described embodiments, the super-heating degree of the low-pressure refrigerant at the refrigerant outlet side of the evaporator 30 or at the refrigerant suction side of the compressor 10 in the ejector cycle is mechanically or electrically detected based on the refrigerant temperature. Generally, the refrigerant temperature is related to the refrigerant pressure. Therefore, the super-heating degree of the low-pressure refrigerant in the ejector cycle can be mechanically or electrically detected based on the refrigerant pressure.

Further, in the above-described embodiments, refrigerant is decompressed to the gas-liquid two-phase state by the variable throttle device 60, before refrigerant flowing into the throttle portion of the nozzle 41 of the ejector 40. However, the variable throttle device 60 is not limited to decompress refrigerant to the gas-liquid two-phase state. That is, the variable throttle device 60 can decompress the high-pressure refrigerant from the condenser 20 to a suitable decompression state, before refrigerant flowing into the throttle portion 41a of the nozzle 41. In addition, in the above-described embodiments, the variable throttle device 60 can be decompressed in iso-entropy.

Such changes and modifications are to be understood as being within the scope of the present invention as defined by the appended claims.

What is claimed is:

1. An ejector cycle comprising:

a compressor for compressing refrigerant;

a high-pressure heat exchanger for cooling high-pressure refrigerant discharged from the compressor;

a low-pressure heat exchanger for evaporating low-pressure refrigerant after being decompressed;

a variable throttle device disposed at a refrigerant outlet side of the high-pressure heat exchanger;

an ejector including a nozzle for decompressing and expanding refrigerant flowing from the variable throttle device by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger; and a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger, wherein the variable throttle device includes a back pressure chamber having an inner pressure that changes by sensing a refrigerant temperature at a refrigerant outlet side of the low-pressure heat exchanger, and a pressure introducing means for introducing a refrigerant pressure at the refrigerant outlet side of the low-pressure heat exchanger to a side opposite to the back pressure chamber.

2. The ejector cycle according to claim 1, wherein:

the variable throttle device further includes a diaphragm for defining the back pressure chamber, and a valve body displaced in accordance with a movement of the diaphragm to change a throttle open degree; and the pressure introducing means is provided to introduce the refrigerant pressure at the refrigerant outlet side of the low-pressure heat exchanger to the side opposite to the back pressure chamber with respect to the diaphragm.

3. The ejector cycle according to claim 1, wherein the valve body changes the throttle open degree in accordance with a super-heating degree of refrigerant at the refrigerant outlet side of the low-pressure heat exchanger.

4. The ejector cycle according to claim 1, wherein the variable throttle device has a temperature transmitting means for transmitting the refrigerant temperature at the refrigerant outlet side of the low-pressure heat exchanger to the back pressure chamber.

5. The ejector cycle according to claim 1, wherein:

the variable throttle device further includes a diaphragm for defining the back pressure chamber, and a valve body displaced in accordance with a movement of the diaphragm to change a throttle open degree; and the pressure introducing means is a refrigerant outer pipe through which the refrigerant outlet side of the low-pressure heat exchanger communicates with a space opposite to the back pressure chamber with respect to the diaphragm.

6. The ejector cycle according to claim 1, wherein:

the variable throttle device further includes a diaphragm for defining the back pressure chamber, a valve body displaced in accordance with a movement of the diaphragm to change a throttle open degree, and a connection rod connecting the diaphragm and the valve body; and a part of the connection rod is exposed in a refrigerant passage through which refrigerant from the refrigerant outlet side of the low-pressure heat exchanger flows, and is used as the pressure introducing means.

7. The ejector cycle according to claim 1, wherein the variable throttle device is disposed to decompress high-pressure refrigerant from the high-pressure heat exchanger, to a gas-liquid two-phase state.

8. The ejector cycle according to claim 1, further comprising a sensor for detecting the refrigerant super-heating degree at the refrigerant outlet side of the low-pressure heat exchanger, wherein the variable throttle device is an electrical throttle that is electrically operated based on the refrigerant super-heating degree detected by the sensor.

9. The ejector cycle according to claim 1, wherein at least a part of the variable throttle device is integrated with the ejector.

10. The ejector cycle according to claim 1, wherein the nozzle decompresses refrigerant after being decompressed in the variable throttle device.

11. The ejector cycle according to claim 1, wherein the refrigerant is freon.

12. The ejector cycle according to claim 1, wherein the refrigerant is carbon dioxide.

13. The ejector cycle according to claim 1, wherein the refrigerant is carbon hydride.

* * * * *